US005391109A

United States Patent [19]

Wadell

[11] Patent Number: 5,391,109

[45] Date of Patent: Feb. 21, 1995

[54] CUTTING OF FOODSTUFF TRANSPORTED IN A CARRIER

[75] Inventor: Lars G. A. Wadell, Aengelholm, Sweden

[73] Assignee: Nestec S.A., Vevey, Switzerland

[21] Appl. No.: 110,165

[22] Filed: Aug. 20, 1993

[30] Foreign Application Priority Data

Sep. 10, 1992 [EP] European Pat. Off. ........... 92115477

[51] Int. Cl.[6] ............................................. A22C 17/02

[52] U.S. Cl. ..................................... 452/155; 452/170

[58] Field of Search ............... 452/155, 149, 141, 142, 452/148, 157, 170; 83/42, 76.6

[56] References Cited

U.S. PATENT DOCUMENTS

| | | | |
|---|---|---|---|
| 1,975,018 | 9/1934 | Palmer | 452/170 |
| 4,463,478 | 8/1984 | Hartmann et al. | 452/170 |
| 4,476,610 | 10/1984 | Wenzel | 452/170 |
| 4,551,885 | 11/1985 | Molnar | 452/170 |

FOREIGN PATENT DOCUMENTS

| | | | |
|---|---|---|---|
| 196141 | 10/1985 | Japan | 452/155 |

*Primary Examiner*—Willis Little

*Attorney, Agent, or Firm*—Vogt & O'Donnell

[57] ABSTRACT

An apparatus assembly for cutting a foodstuff has a conveyor and a carrier affixed to the conveyor for transporting a foodstuff, a cutting device having a circular blade and a pusher for positioning a foodstuff in the carrier for cutting. The carrier is separated into two,portions by a gap and has a hinged cover which extends from a position adjacent the gap for covering one portion of the carrier between the sidewalls. The cover is configured for holding the foodstuff in position in the carrier during cutting of the foodstuff, as the carrier passes a blade of the cutting device which passes through the gap from one sidewall to the other for cutting the foodstuff into pieces, and the cover also is configured for allowing, prior to cutting, the foodstuff to be pushed for positioning an amount of the foodstuff under the cover for cutting.

18 Claims, 1 Drawing Sheet

CUTTING OF FOODSTUFF TRANSPORTED IN A CARRIER

BACKGROUND OF THE INVENTION

The present invention relates to a machine and process for cutting a frozen foodstuff into pieces of a predetermined size.

The cutting of frozen foodstuffs involves severe problems because it is extremely difficult to hold the frozen foodstuffs in a fixed position during the cutting operation and, therefore, the cut pieces are not always of the desired size.

SUMMARY OF THE INVENTION

According to the present invention there is provided a machine for cutting a frozen foodstuff into pieces of a predetermined size which comprises a conveyor, means for advancing the conveyor, a carrier affixed to the conveyor for carrying a foodstuff, a pusher for pushing and positioning a foodstuff carried on the carrier and a circular saw cutting device for cutting the foodstuff positioned and carried in the carrier. The carrier affixed to the conveyor has a gap positioned therein so that when the conveyor transports the carrier to the cutting device, the gap is aligned with the blade of the cutting device for cutting the foodstuff when the cutting device is in a cutting position. The cover, which has a lower surface capable of holding the foodstuff in a fixed position during cutting, is positioned at one side of the carrier laterally of the gap and is moved from an open position upstream of the circular cutting device to a closed position when adjacent the circular cutting device and then the cover is opened at a position downstream of the circular cutting device. At a position upstream of the cutting device, the pusher is adapted to push the foodstuff on the carrier transversely to the direction of motion of the conveyor to a position so that a predetermined amount of foodstuff lies beyond the gap beneath the cover.

The present invention also provides a process for cutting a foodstuff into pieces having a predetermined size which comprises placing a foodstuff on a carrier fixed to a conveyor at a position upstream of a circular cutting device and transporting the conveyor and carrier in a direction parallel to the blade so that a gap in the carrier is aligned with the blade of the cutting device. One side of the carrier is covered laterally of the gap with a cover, and upstream of the cutting device blade, the foodstuff is pushed on the carrier transversely to the direction of motion of the conveyor and carrier to a position so that a predetermined amount of the foodstuff lies beyond the gap beneath the cover. The positioned foodstuff is held in a fixed position by the lower surface of the cover, and the conveyor and carrier transports the positioned foodstuff to a position beneath the cutting device for cutting the foodstuff into pieces. The carrier is uncovered downstream of the cutting device.

DESCRIPTION OF PREFERRED EMBODIMENTS

The machine of the present invention is suitable for cutting frozen fish, meat or vegetables, especially for individual quick frozen fish fillets.

The conveyor is conveniently a chain conveyor. The circular cutting device may be a circular knife but is preferably a circular saw.

Advantageously, there may be more than one circular cutting device arranged consecutively and more than one pusher adapted to push the foodstuff intermittently upstream of each cutting device so that, after each push, a predetermined amount of the foodstuff lies beyond the gap in the carrier for cutting. This enables one portion of the frozen foodstuff to be cut into more than two pieces.

The carrier is advantageously a pocket carrier. The cover is preferably hinged and is conveniently spring-loaded in an open position. The cover may be moved from the open to closed position by any suitable means, for example, a guide rail. The lower surface of the cover, while capable of holding the foodstuff in a fixed position during cutting, is preferably also adapted to allow the foodstuff to be pushed incrementally by the pusher to one or more new cutting positions so that the foodstuff can be cut into more than two pieces. For example, the lower surface of the cover may be provided with a plurality of resilient projections which are conveniently bristles and form a brush. Conveniently, there are a plurality of carriers fixed consecutively to the conveyor.

Advantageously, to enable cutting the foodstuff into pieces of a predetermined weight, an ultrasonic measuring device adapted to take information on the shape and size of the foodstuff as it is transported on the carrier is employed and conveniently comprises a plurality of sensors, the number of sensors being proportional to the length of the foodstuff, such as that described in our European Patent Application 89122139.2. When the foodstuff passes beneath the sensors, each sensor measures a section of the foodstuff, the number of measurements being taken being proportional to the size of the foodstuff and the requirements for weight accuracy. Information on the section area, speed, length and thickness at several points over the surface is recorded and passed to a control unit computer adapted to receive and process the information for actuation of the apparatus for cutting the foodstuff into portions of predetermined size. The section area is obtained by measuring the thickness of the foodstuff section in each section point, and the volume of each piece to be cut is calculated from the product of the section area and the length.

The computer, preprogrammed for the specific gravity and the desired weight of the foodstuff piece to be cut, receives and processes the information from the ultrasonic measuring device and controls the movements of the pusher. After receiving the information from the ultrasonic measuring device, the computer control device calculates the length needed for a given piece weight and for actuation of apparatus, such as a pulse motor, so that the foodstuff may be positioned to be cut into pieces of a predetermined weight.

The present invention is further illustrated by way of example with reference to the accompanying drawings.

DETAILED DESCRIPTION OF THE DRAWINGS

Figure 1:
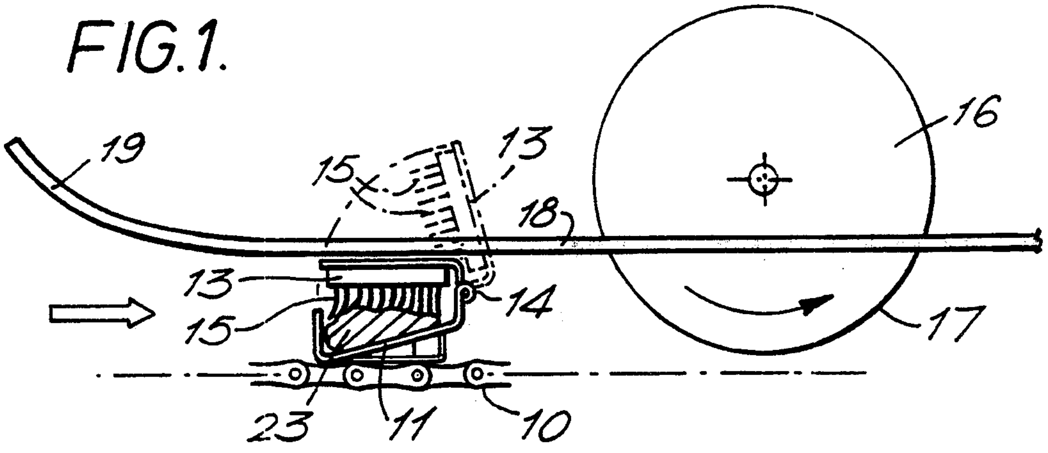
FIG. 1 represents a sectional side view of an apparatus according to the present invention.
Figure 2:
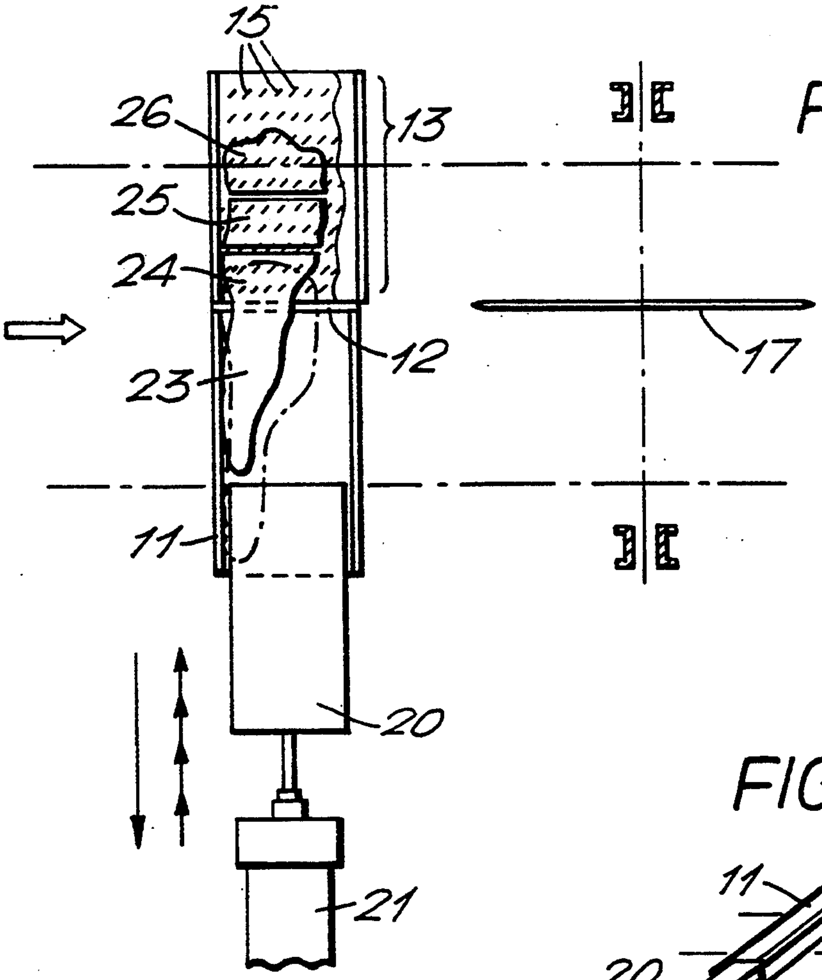
FIG. 2 represents a top plan view of the apparatus of FIG. 1.
Figure 3:
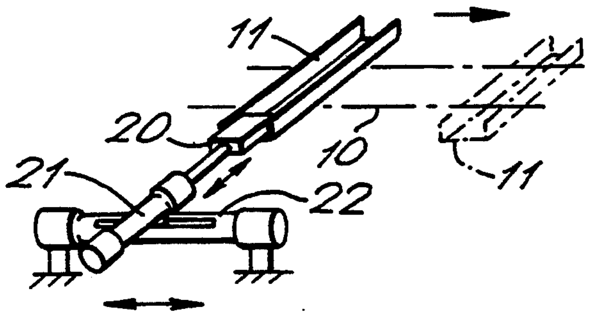
FIG. 3 represents a perspective view of a pusher member of an apparatus according to the invention.

The apparatus of drawing FIGS. 1 and 2 comprises an endless chain conveyor belt 10 fixed to which is a pocket carrier 11 having a base and opposing sidewalls which extend from the base and having a gap 12 therein, which separates the carrier into two portions, and having a cover 13 which when closed, as illustrated, extends between the sidewalls. The cover is connected to the carrier by means of a spring-loaded hinge 14, the lower surface of the cover being provided with bristles 15. Downstream of the carrier 11 is a circular saw 16 with a blade 17 aligned with the gap 12 which provides for passing the blade 17 between the two carrier portions from one sidewall to the other for cutting a foodstuff 23 supported on the base and contained between the sidewalls into pieces positioned above the carrier is a guide rail 18 which has a curved portion 19 upstream of the circular saw 16. A pusher 20, operated by a piston 21 which reciprocates on a track 22, (FIG. 3) is positioned laterally to the carrier 11. The pusher and piston reciprocate in two directions perpendicular to each other, as indicated by the double arrows of FIG. 3. The pusher is controlled by a computer (not shown) preprogrammed for the specific gravity and the desired weight to be cut and which has received and processed the information from an ultrasonic measuring device (not shown). An individual quick frozen fillet 23 having cut portions 24,25 and 26 is shown positioned in the carrier of FIGS. 1 and 2.

In operation, a pocket carrier 11, with its cover 13 open and positioned upstream of the curved part 19 of the guide rail 18, is fed with an individual quick frozen fillet 23 in a way that its entirety lies laterally of the groove 12 on the side of the carrier facing the pusher 20. The carrier advances downstream and the curved part 19 of the guide rail 18 presses on the cover 13 and lower the cover to cover the carrier. The carrier arrives at a position adjacent the pusher 20 whereupon the pusher, while travelling synchronously with the carrier on the track 22 (to the right in FIGS. 2 and 3) advances laterally within the carrier in a direction parallel to the sidewalls to push the fillet 23 a predetermined distance beyond the groove 12 (FIG. 2). The pusher then retracts from the carrier and travels in the opposite direction on the track 22 (to the left in FIGS. 2 and 3). The carrier continues to advance beneath the circular saw 16 where the blade 17 passes through the groove 12 to cut the fillet 23 which is held firmly in position by the bristles 15.

After passing beyond the circular saw 16, the carrier arrives at a position adjacent a further pusher 20 and then passes beneath a further circular saw where the procedure is repeated. When the appropriate number of cuts have been made, the carrier passes beneath a part of the guide rail 18 which is curved upwards causing the cover to be raised to the open position enabling the cut pieces of the fillet to be removed from the carrier.

FIG. 2 also shows a fillet 23 with cut portions 24, 25 and 26 beyond the groove 12, and the pusher 20 is about to push the fillet a further predetermined distance beyond the groove 12 for cutting.

I claim

1. In an apparatus assembly for cutting a foodstuff article having a cutting device having a circular blade, a conveyor and means for advancing the conveyor, a carrier and a pusher for positioning a foodstuff article on the carrier for cutting, wherein the carrier is affixed to the conveyor and has a base and opposing sidewalls which extend from the base and has a gap therein which separates the carrier into first and second portions for passing the blade from one sidewall to the other between the portions for cutting a foodstuff article supported on the base and contained between the sidewalls into pieces, and wherein the conveyor, carrier and blade are arranged for transporting the carrier containing a foodstuff article to and past the blade for cutting a foodstuff article in the carrier, the improvements comprising:

a cover for covering and uncovering the first carrier portion and a hinge which connects the cover to one sidewall of the first carrier portion wherein the cover is positioned to extend from a position adjacent the gap and wherein the cover is configured for, upon covering the first carrier portion, extending between the sidewalls and for holding a foodstuff article positioned on the base and between the sidewalls in a fixed position during cutting but allowing the foodstuff article to be pushed from the second carrier portion to the first carrier portion under the cover for positioning for cutting; and a reciprocative pusher positioned for reciprocating into and out of the carrier having a covered first portion in a direction parallel to the carrier sidewalls for pushing a portion of a foodstuff article in the carrier from the first carrier portion to the second carrier portion under the cover for positioning the foodstuff article and so that in a direction of conveyor transport of the carrier to the blade, the pusher is positioned so that upon conveyor transport of the carrier, the pusher reciprocates into and out of the carrier at a position prior to the carrier reaching the blade.

2. An apparatus assembly according to claim 1 wherein the pusher is also reciprocative in a direction perpendicular to the reciprocation direction into and out of the carrier.

3. An apparatus assembly according to claim 1 further comprising means for moving the cover to cover the first carrier portion which is positioned so that in a direction of conveyor transport of the carrier to the blade, the cover moving means is positioned so that upon conveyor transport of the carrier, the first carrier portion is covered prior to the carrier reaching the pusher.

4. An apparatus assembly according to claim 3 wherein the means for moving the cover is a rail having a curve positioned so that upon conveyor transport of the carrier to the pusher, the curve of the rail contacts the cover to guide the cover to cover the first carrier portion prior to the carrier reaching the pusher.

5. An apparatus assembly according to claim 1 further comprising means for moving the cover to cover the first carrier portion which is positioned so that in a direction of conveyor transport of the carrier to the blade, the cover moving means is positioned so that upon conveyor transport of the carrier, the first carrier portion is covered prior to the carrier reaching the pusher and wherein the pusher is also reciprocative in a direction perpendicular to the reciprocation direction into and out of the carrier.

6. An apparatus assembly according to claim 5 wherein the means for moving the cover is a rail having a curve positioned so that upon conveyor transport of the carrier to the pusher, the curve of the rail contacts the cover to guide the cover to cover the first carrier portion prior to the carrier reaching the pusher.

7. An apparatus assembly according to claim 1 wherein the cover is configured with resilient projections which, when the first carrier portion is covered, extend toward the base for holding a foodstuff article during cutting.

8. An apparatus assembly according to claim 7 wherein the projections are bristles.

9. An apparatus assembly according to claim 1 wherein the cover and hinge are spring-loaded.

10. An apparatus assembly according to claim 1 wherein the blade is a blade of a circular knife cutting device.

11. An apparatus assembly according to claim 1 wherein the blade is a blade of circular saw cutting device.

12. An apparatus assembly according to claim 1 further comprising a plurality of carriers affixed to the conveyor.

13. An apparatus assembly according to claim 1 further comprising a plurality of pushers and a plurality of cutting devices and wherein the pushers and cutting devices are positioned so that the conveyor conveys the carrier to one pusher and then to one cutting device consecutively.

14. In a process for cutting a foodstuff wherein the foodstuff is placed and transported in a carrier having a base and sidewalls which extend from the base and having a gap therein which separates the carrier into first and second portions for passing a circular blade of a cutting device between the portions so that upon transport of the carrier to and past the blade, the blade passes through the gap and cuts the foodstuff, the improvements comprising:

covering the first portion of the carrier containing the foodstuff with a cover which is positioned to extend from a position adjacent the gap and configured to extend between the sidewalls and which is suitable for holding the foodstuff in a fixed position during cutting but which allows the foodstuff to be pushed from the second portion to the first portion under the cover, pushing the foodstuff for positioning an amount of the foodstuff under the cover of the carrier, transporting the carrier to and past the blade for passing the blade through the gap and cutting the pushed, positioned foodstuff and after cutting, uncovering the first carrier portion.

15. A process according to claim 14 wherein the cover is moved to cover the first carrier portion while the carrier is being transported.

16. A process according to claim 14 wherein the foodstuff is pushed while the carrier is transported.

17. A process according to claim 14 wherein the foodstuff is pushed and then cut a plurality of times.

18. A process according to claim 14 wherein the foodstuff is frozen.

* * * * *